United States Patent [19]

Kim

[11] Patent Number: 5,727,045
[45] Date of Patent: Mar. 10, 1998

[54] SYSTEM AND METHOD FOR AVOIDING UNDESIRED INCOMING TELEPHONE CALLS

[75] Inventor: Hyon-Sok Kim, Gumi, Rep. of Korea

[73] Assignee: SamSung Electronics Co., Ltd., Suwon, Rep. of Korea

[21] Appl. No.: 568,768

[22] Filed: Dec. 7, 1995

[30] Foreign Application Priority Data

Dec. 8, 1994 [KR] Rep. of Korea ............... 33253/1994

[51] Int. Cl.$^6$ ............................................. H04M 1/56
[52] U.S. Cl. ........................... 379/67; 379/372; 379/374
[58] Field of Search ............................ 379/67, 70, 77, 379/81, 88, 142, 373, 374, 375, 376

[56] References Cited

U.S. PATENT DOCUMENTS

| | | | |
|---|---|---|---|
| 4,121,052 | 10/1978 | Richard | 379/142 |
| 4,241,238 | 12/1980 | Strand | 379/142 |
| 4,304,968 | 12/1981 | Klausner et al. | 379/142 |
| 4,672,660 | 6/1987 | Curtin | 379/88 |
| 4,803,717 | 2/1989 | Marui | 379/142 |
| 4,817,133 | 3/1989 | Takahashi et al. | 379/142 |
| 4,894,861 | 1/1990 | Fujioka | 379/374 |
| 5,029,200 | 7/1991 | Haas et al. | 379/89 |
| 5,070,521 | 12/1991 | Warner et al. | 379/58 |
| 5,263,084 | 11/1993 | Chaput et al. | 379/215 |
| 5,265,145 | 11/1993 | Lim | 379/88 |
| 5,274,699 | 12/1993 | Ranz | 379/142 |
| 5,329,578 | 7/1994 | Brennan et al. | 379/67 |
| 5,349,638 | 9/1994 | Pitroda et al. | 379/142 |
| 5,388,150 | 2/1995 | Schneyer et al. | 379/67 |
| 5,394,445 | 2/1995 | Ball et al. | 379/67 |
| 5,428,662 | 6/1995 | Hamilton | 379/24 |
| 5,434,906 | 7/1995 | Robinson et al. | 379/67 |
| 5,446,785 | 8/1995 | Hirai | 379/142 |
| 5,452,346 | 9/1995 | Miyamoto | 379/142 |
| 5,467,385 | 11/1995 | Reuben et al. | 379/88 |
| 5,526,406 | 6/1996 | Luneau | 379/61 |

*Primary Examiner*—Krista Zele
*Assistant Examiner*—Daniel S. Hunter
*Attorney, Agent, or Firm*—Robert E. Bushnell, Esq.

[57] ABSTRACT

A method for avoiding undesired incoming calls provides a called party with an aural message indicating the telephone number of a calling party. The method includes the steps of: enabling the called party's telephone to ring in response to input of a ring signal during execution of a selective calling mode; connecting a signal path between the calling party's telephone and the called party's telephone; transmitting a voice message to the calling party requesting that the calling party input his or her telephone number and then input a predetermined key; determining whether a busy tone indicating that the calling party has hung up is detected; stopping the called party's telephone from ringing and disconnecting the signal path when the busy tone is detected; waiting for an input of a dual tone multi-frequency (DTMF) signal representative of the calling party's telephone number during a predetermined time period when the busy tone is not detected; storing the dual tone multi-frequency (DTMF) signal and then reading the dual tone multi-frequency (DTMF) signal upon completion of the input; providing the called party with an aural voice message representative of the calling party's telephone number; checking for an off-hook state of the called party's telephone; and stopping the called party's telephone from ringing and enabling execution of a conversation between the calling party and the called party when the off-hook state of the called party's telephone is detected.

15 Claims, 3 Drawing Sheets

SYSTEM AND METHOD FOR AVOIDING UNDESIRED INCOMING TELEPHONE CALLS

CROSS-REFERENCE TO RELATED APPLICATIONS

This application makes reference to, incorporates the same herein, and claims all benefits accruing under 35 U.S.C. §119 from an application for System And Method For Avoiding Undesired Incoming Telephone Calls earlier filed in the Korean Industrial Property Office on 8 Dec. 1994 and there assigned Ser. No. 33253/1994.

BACKGROUND OF THE INVENTION

The present invention relates to a system and method for avoiding undesired incoming telephone calls, and more particularly a system and method for avoiding undesired incoming telephone calls by providing a called party with an aural indication of the telephone number of a calling party.

In a conventional method of avoiding undesired incoming telephone calls, a calling party is required to enter key inputs corresponding to a secret number or code of a called party in order to execute a telephone call. However, since the calling party is required to remember the called party's secret code, in addition to the called party's telephone number, a problem arises if the calling party does not know, or has forgot, the called party's secret code. In such a case, it becomes impossible for the calling party to contact the called party. This can be especially troublesome in emergency situations. This type of conventional method is disclosed in detail in Korean Patent Application No. 92-15922, which relates to a method for displaying a calling party's telephone number.

Another conventional method for avoiding undesired incoming telephone calls is disclosed in U.S. Pat. No. 5,446,785 entitled Telephone Terminal Equipment In Which Telephone Numbers Of Callers Are Displayed issued to Hirai. In Hirai '785, a called party is provided with a display indicating the source of an incoming call. From this display, the called party can determine whether the incoming call is one that should be answered. While conventional art, such as Hirai '785, possesses merit in its own right, I believe that an improved system and method for avoiding undesired incoming telephone calls can be contemplated.

SUMMARY OF THE INVENTION

Accordingly, it is an object of the present invention to provide an improved system and method for avoiding undesired incoming telephone calls.

It is another object to provide a system and method for avoiding undesired incoming telephone calls in which a called party receives a voice message indicating the telephone number of a calling party.

It is still another object to provide a system and method for avoiding incoming telephone calls in which a calling party enters his telephone number through a key pad on his telephone.

It is yet another object to provide a system and method for avoiding incoming telephone calls which does not require a calling party to memorize a secret code associated with a called party.

It is still yet another object to provide a system and method for avoiding incoming telephone calls in which a called party can decide whether to answer an incoming call based on a voice message announcing the telephone number of the calling party.

To achieve these and other objects, the present invention provides a telephone system having a general calling mode, and a selective calling mode in which a called party receives an aural indication of the telephone number of a calling party. During the selective calling mode, a calling party receives a voice message requesting input of his or her telephone number through the telephone key pad. The calling party's telephone number is received by the telephone system of the called party as a dual tone multi-frequency (DTMF) signal which is decoded, and aurally provided to the called party as a voice message. Upon hearing the telephone number corresponding to the calling party, the called party can determine whether or not he wants to answer the incoming call. Accordingly, the called party can be informed of the source of an incoming call and undesired incoming calls can be successfully avoided, even when the called party is not directly present at the telephone terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
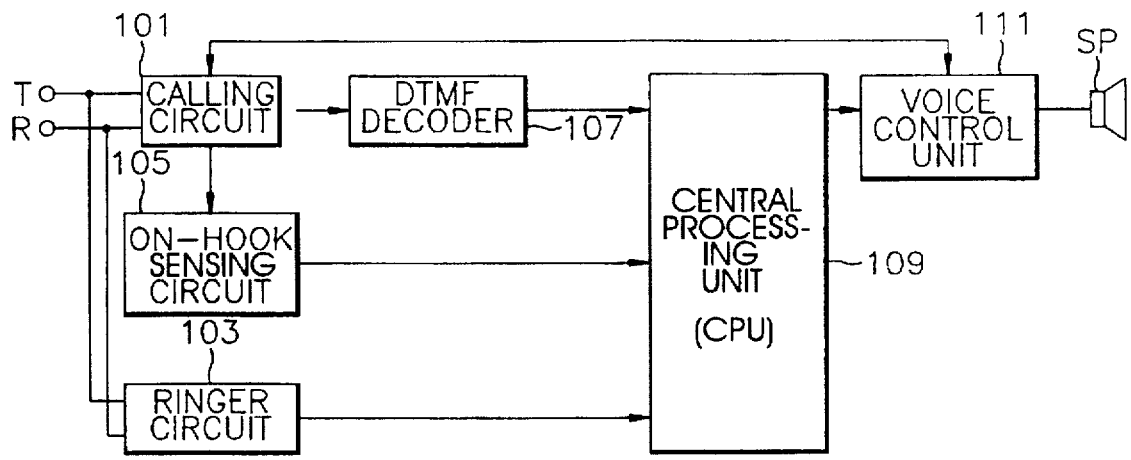
FIG. 1 is a circuit diagram illustrating a telephone system constructed according to the principles of the present invention.

Turning now to the drawings and referring to FIG. 1, a circuit diagram illustrating a telephone system constructed according to the principles of the present invention is shown. The circuit diagram of FIG. 1 includes an on-hook sensing circuit 105 for sensing an on-hook signal provided from the telephone of a party (i.e., calling party) placing a call to the telephone system shown through a calling circuit 101 connected to telephone lines T and R (i.e., tip (T) and ring (R)). A dual tone multi-frequency (DTMF) decoder 107 decodes a dual tone multi-frequency (DTMF) signal provided from the calling party through calling circuit 101. A ringer circuit 103 generates a ring signal in dependence upon an incoming call through telephone lines T and R. A central processing unit (CPU) 109 controls output of voice messages in dependence upon the ring signal output from ringer circuit 103, receives and buffers inputs provided from the calling party through dual tone multi-frequency (DTMF) decoder 107, controls connection of a signal path between the telephone system shown and the calling party in dependence upon on-hook and off-hook sensing signals provided from the calling party, and controls operation of the telephone system shown according to a called party's confirmation and approval of the calling party's telephone number. A voice control unit 111 controls transmission of a voice message to the calling party requesting that the calling party input his or her telephone number and then input a predetermined key (e.g., the "*" key) under the control of central processing unit 109 (CPU), as the ring signal is simultaneously output from finger circuit 103. Voice control unit 111 controls output of an aural voice message representative of the dual tone multi-frequency (DTMF) signal through a speaker (SP) after receipt and storage of the dual tone multi-frequency (DTMF) signal provided from the calling party.

Figure 2:
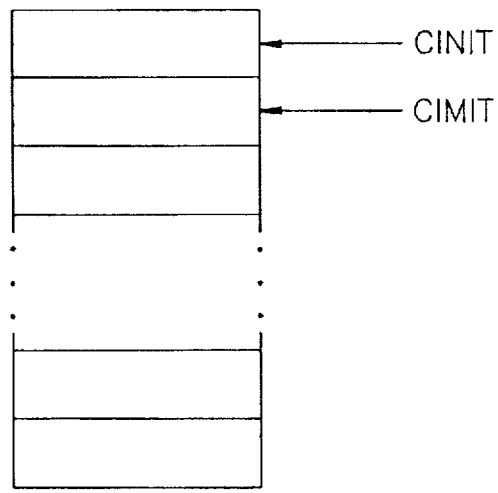
FIG. 2 is a memory map for illustrating data inputs according to the principles of the present invention.

FIG. 2 is a memory map for illustrating data inputs in an embodiment of the present invention utilizing a first-in first-out (FIFO) type of internal buffer within central processing unit 109. With the present invention, until a predetermined key (such as the "*" key) is input, or key inputs in excess of 32 digits are provided by the calling party, a first count value "Cimit" representative of the number of key inputs written to the internal buffer is incremented by one. After the "*" key is input, or key inputs exceeding 32 digits are provided by the calling party, the content of the internal buffer is read, while a second count value "Cinit" representative of the number of inputs read from the internal buffer is incremented. As the second count value "Cinit" is incremented, the first count value "Cimit" remains fixed. When the second count value "Cinit" is equal to the first count value "Cimit", the second count value "Cinit" is initialized to zero. At this time, if the calling party hangs up (i.e., performs an on-hook), the first count value "Cimit" and the second count value "Cinit" are both initialized to zero and operation of the telephone system stops.

Figure 3:
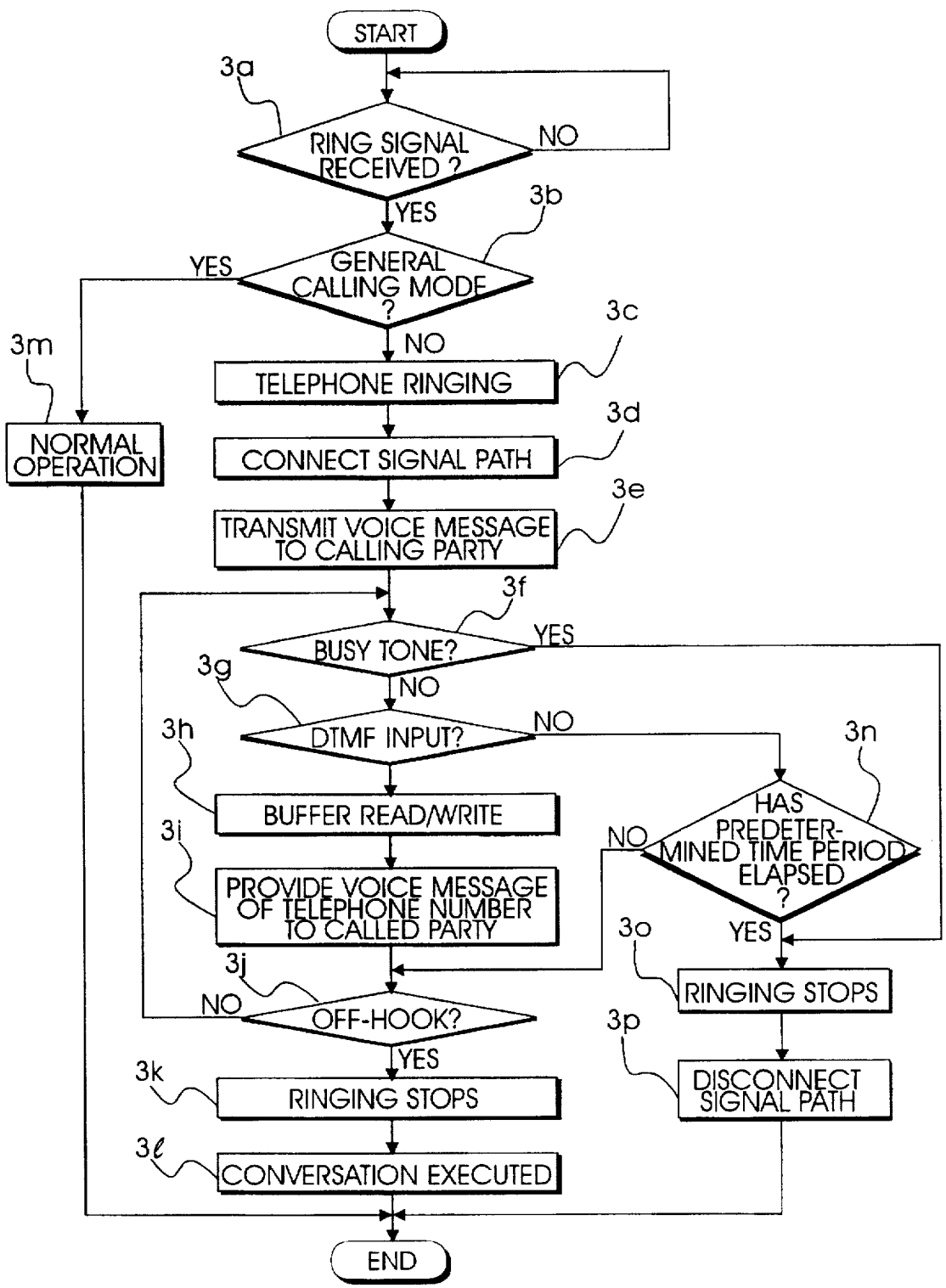
FIG. 3 is a flow chart illustrating a method performed by the telephone system constructed according to the principles of the present invention.

FIG. 3 is a flow chart illustrating a method performed by the telephone system constructed according to the principles of the present invention. The flow chart shown in FIG. 3 contemplates steps of: enabling a called party's telephone to ring in response to input of a ring signal during execution of a selective calling mode; connecting a signal path between a calling party's telephone and the called party's telephone; transmitting a voice message to the calling party requesting that the calling party input his or her telephone number and then input a predetermined key to indicate that the telephone number has been completely input (i.e., the "*" key is used in the preferred embodiment of the present invention); determining whether a busy tone indicating that the calling party has hung up (i.e., performed an on-hook) is detected; stopping the called party's telephone from ringing and disconnecting the signal path when the busy tone is detected; waiting for an input of a dual tone multi-frequency (DTMF) signal representative of the calling party's telephone number during a predetermined time period when the busy tone is not detected; storing the dual tone multi-frequency (DTMF) signal and then reading the dual tone multi-frequency (DTMF) signal upon completion of the input; providing the called party with an aural voice message representative of the calling party's telephone number; checking for an off-hook state of the called party's telephone; and stopping the called party's telephone from ringing and enabling execution of a conversation between the calling party and the called party when the off-hook state of the called party's telephone is detected.

Figure 4:
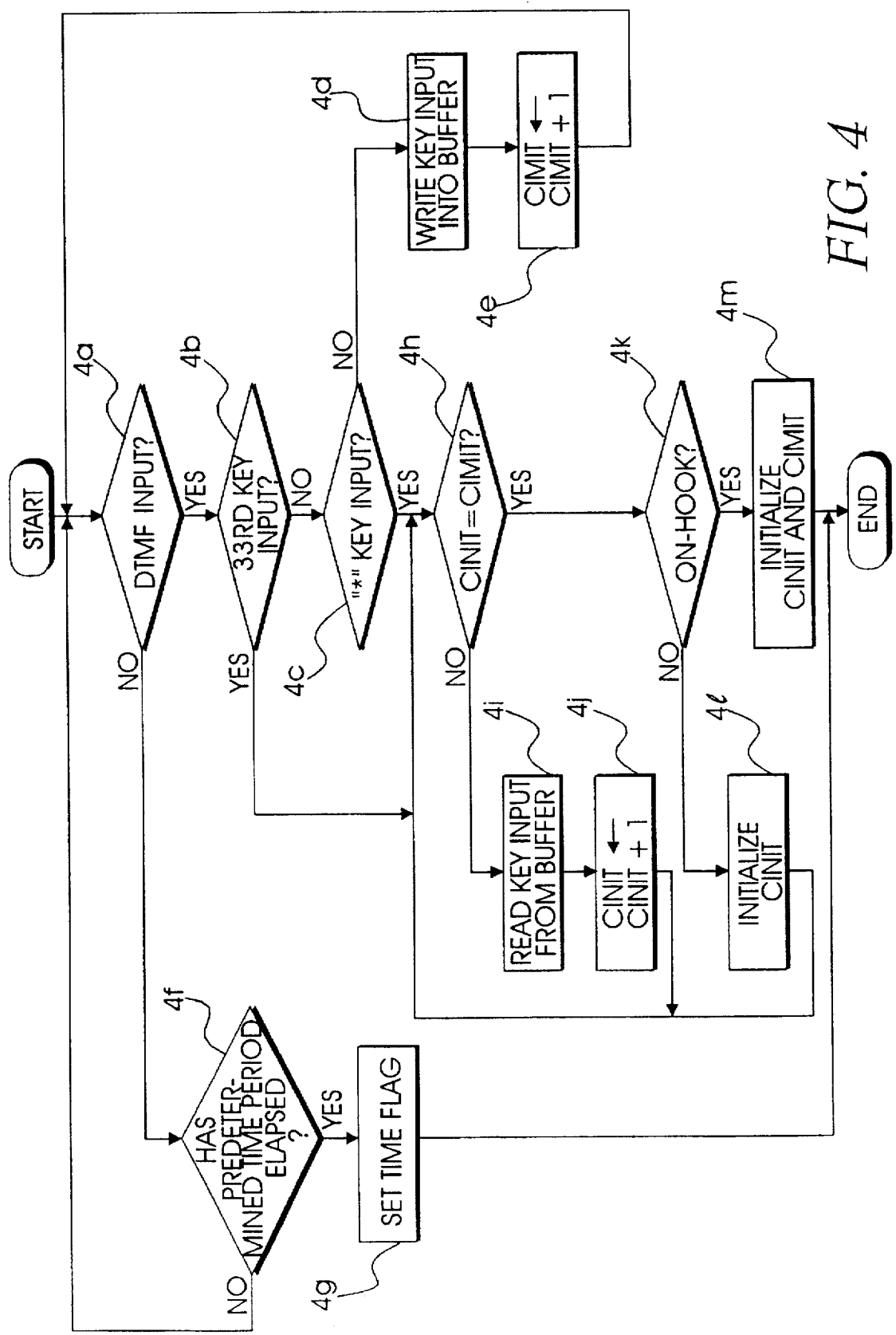
FIG. 4 is a detailed flow chart illustrating a buffer reading and writing process performed according to the principles of the present invention.

FIG. 4 is a detailed flow chart illustrating a buffer reading and writing process performed according to the principles of the present invention. The flow chart shown in FIG. 4 contemplates the steps of: detecting key inputs representative of the calling party's telephone number during the predetermined time period; setting a time flag and completing the process when there are no key inputs during the predetermined time period; determining whether a given number of key inputs have been entered, or whether the "*" key has been input, when key inputs are provided by the calling party; writing the key inputs into the internal buffer while incrementing the first count value "Cimit" when the given number of key inputs have not been entered and the "*" key has not been input; determining whether the first count value "Cimit" and the second count value "Cinit" are equal when either the given number of key inputs have been entered or the "*" key has been input; determining whether the calling party's telephone is in an on-hook state when the first count value "Cimit" and the second count value "Cinit" are equal; initializing the first count value "Cimit" and the second count value "Cinit" and clearing the internal buffer when the calling party's telephone is in the on-hook state; and reading the key inputs from the internal buffer while incrementing the second count value "Cinit" until the first count value "Cimit" and the second count value "Cinit" are equal.

A detailed description of a preferred embodiment of the present invention will now be provided with reference to FIG. 1 through FIG. 4.

As shown in FIG. 1, when the ring signal is output from telephone lines T and R and provided to central processing unit (CPU) 109 through ringer circuit 103, the ring signal is sensed by central processing unit (CPU) 109. Voice control unit 111 is then operated by central processing unit (CPU) 109 to transmit a voice signal to the calling party through calling circuit 101. The voice message requests the calling party to input his or her telephone number and then input a predetermined key, such as the "*" key. Input of the predetermined key indicates that the calling party's telephone number has been completely input. If the calling party inputs the telephone number, dual tone multi-frequency (DTMF) decoder 107 interprets a dual tone multi-frequency (DTMF) signal representative of the calling party's telephone number received via the telephone line and calling circuit 101, and then transmits the dual tone multi-frequency (DTMF) signal to central processing unit (CPU) 109. After central processing unit (CPU) 109 stores the dual tone multi-frequency (DTMF) signal received from dual tone multi-frequency (DTMF) decoder 107 in the internal buffer, the telephone number of the calling party is read from the internal buffer and aurally presented to the called party as a voice message through voice control unit 111 and speaker (SP). This enables the called party to hear the calling party's telephone number and determine whether the incoming call is one that he wants to answer.

In the above description, if no key inputs are provided by the calling party during the predetermined time period, or the calling party performs an on-hook operation by hanging up the telephone handset, central processing unit (CPU) 109 terminates operation.

Referring to the internal buffer of central processing unit (CPU) 109 shown in FIG. 2, the first count value "Cimit" is incremented by one (i.e., "Cimit"="Cimit"+1) for each key input provided by the ailing party, until the "*" key is input or key inputs in excess of 32 digits are entered. When one of these latter conditions is satisfied, the contents of the internal buffer are sequentially read while the second count value "Cinit" is incremented by one (i.e., "Cinit"="Cinit"+1). The first count value "Cimit" remains fixed while the second count value "Cinit" is incremented. When the second count value "Cinit" and the first count value "Cimit" are equal (i.e., "Cinit"="Cimit"), the buffer contents are read again so that the voice message can be aurally provided to the called party. During this time, if the calling party performs an on-hook operation by hanging up the telephone handset, the first count value "Cimit" and the second count value "Cinit" are initialized (i.e., "Cinit"=0, "Cimit"=0) and the process is completed.

Referring now to FIG. 3, central processing unit (CPU) 109 determines whether the ring signal is received through ringer circuit 103 in step 3a. When the ring signal is received, a decision is made in step 3b to determine whether central processing unit (CPU) 109 is in a general calling mode or the selective calling mode.

When central processing unit (CPU) 109 is determined in step 3b to be in the general calling mode, normal operation of the telephone system is commenced in step 3m. However, when central processing unit (CPU) 109 is in the selective calling mode, the called party's telephone rings in step 3c, and a signal path connecting the calling party's telephone and the called party's telephone is established in step 3d. Voice control unit 111 is then controlled so that the voice message requesting the calling party to input his or her telephone number and then input a predetermined key, such as the "*" key (to indicate that the telephone number has been completely input), is transmitted to the calling party through calling circuit 101 and the telephone lines in step 3e.

Next, in step 3f, if the calling party performs the on-hook operation by hanging up the telephone handset in response to the voice message delivered in step 3e, a busy tone is generated. Otherwise, the calling party is presumed to input his telephone number through a key pad provided on his telephone. At this time, if the calling party performs the on-hook operation, the busy tone is generated in step 3f, ringing of the called party's telephone stops in step 3o, and the signal path is disconnected in step 3p. Alternatively, the calling party inputs his telephone number, and the telephone number is provided as a dual tone multi-frequency (DTMF) signal through the telephone lines and calling circuit 101 for decoding in dual tone multi-frequency (DTMF) decoder 107. Input of the dual tone multi-frequency (DTMF) signal representative of the calling party's telephone number is detected in step 3g by central processing unit (CPU) 109. If the dual tone multi-frequency (DTMF) signal is not input in step 3g, a decision is made in step 3n to determine whether a predetermined time period has elapsed. That is, the calling party has a predetermined time period in which to input his telephone number.

If the predetermined time period has elapsed in step 3n, the called party's telephone stops ringing in step 3o and the signal path is disconnected in step 3p. However, if the predetermined time period has not elapsed in step 3n, a decision is made in step 3j to determine whether the called party performs an off-hook operation by answering his telephone.

Referring back to step 3g, after the dual tone multi-frequency (DTMF) signal representative of the calling party's telephone number is input, the internal buffer of central processing unit (CPU) 109 shown in FIG. 2 is controlled to thereby write and read the decoded dual tone multi-frequency (DTMF) signal into and from the internal buffer in step 3h.

The signal read in step 3h is then provided to voice control unit 111 for conversion into an analog voice signal. In step 3i, a synthesized voice message announcing the calling party's telephone number is aurally provided to the called party through speaker (SP). When the called party hears the voice message and determines that the telephone number represents a desired incoming call, the called party performs the off-hook operation to answer the call in step 3j. In response to performance of the off-hook operation, the called party's telephone stops ringing in step 3k, and a conversation between the calling party and the called party is executed in step 3l.

The buffer read/write process of step 3h in FIG. 3 will now be described in detail with reference to FIG. 4. In step 4a, central processing unit (CPU) 109 determines whether the telephone system is receiving any dual tone multi-frequency (DTMF) signals by checking for inputs provided from dual tone multi-frequency (DTMF) decoder 107. If no inputs are detected in step 4a, central processing unit (CPU) 109 determines whether the predetermined time period has elapsed in step 4f.

If the predetermined time period has elapsed in step 4f, a time flag is set in step 4g and all operations are stopped. However, if a dual tone multi-frequency (DTMF) signal input is detected in step 4a, central processing unit (CPU) 109 determines whether the input corresponds to either a 33rd key input in step 4b, or to an "*" key input in step 4c. In the preferred embodiment of the present invention, the number 33 has been selected, as an example, to represent the maximum allowable number of inputs that can be entered. This exemplary designation serves only as a design choice and is not intended to limit the scope of the present invention. Similarly, the "*" key which serves as a predetermined key input could be substituted, for example by the "#" key, without departing from the scope of the present invention.

If the input corresponds to either the 33rd key input or to an "*" key input, this indicates that all key inputs of the calling party's telephone number have been entered. However, if the input does not correspond to either the 33rd key input or an "*" key input, the input dual tone multi-frequency (DTMF) signal is written into the internal buffer of central processing unit (CPU) 109 in step 4d, and the first count value "Cimit" is incremented by one (i.e., "Cimit"= "Cimit"+1) in step 4e. After the above steps are repeatedly performed so that either the 33rd key input or the "*" key input has been entered, a decision is made to determine whether the first count value "Cimit" and the second count value "Cinit" are equal in step 4h.

If the first count value "Cimit" and the second count value "Cinit" are not equal in step 4h, a key input is read from the internal buffer in step 4i and the second count value "Cinit" is incremented by one (i.e., "Cinit"="Cinit"+1) in step 4j.

When the first count value "Cinit" equals the second count value "Cimit" in step 4h, central processing unit (CPU) 109 determines whether the calling party's telephone represents the on-hook state by sensing an output of on-hook sensing circuit 105 in step 4k. When the on-hook state of the calling party's telephone is detected in step 4k indicating that the calling party has hung up the handset of his telephone, the first count value "Cimit" and the second count value "Cinit" are initialized in step 4m. Alternatively, when the on-hook state of the calling party's telephone is not detected in step 4k, the read counter "Cinit" is initialized in step 4l and step 4h is again performed.

As set forth above, the present invention provides a telephone system having a general calling mode and a selective calling mode where a calling party's telephone number is aurally presented as a voice message to the called party. Accordingly, the called party receives aural notification of the source of an incoming call and can therefore determine whether he desires to answer the call before doing so.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for avoiding undesired incoming telephone calls, comprising the steps of:

enabling a called party's telephone to ring in response to input of a ring signal to said called party's telephone during a selective calling mode;

connecting a signal path between said called party's telephone and a calling party's telephone;

transmitting, during said step of enabling a called party's telephone to ring in response to input of a ring signal, a voice message to said calling party requesting that said calling party input a telephone number corresponding to said calling party and then input a predetermined key to indicate that said telephone number has been completely input;

determining whether a busy tone indicating that said calling party has performed an on-hook operation is detected;

stopping said called party's telephone from ringing and disconnecting said signal path between said called party's telephone and a calling party's telephone when said busy tone is detected;

waiting for inputs of a dual tone multi-frequency signal representative of said telephone number corresponding to said calling party during a predetermined time period when said busy tone is not detected;

storing said inputs of said dual tone multi-frequency signal received during said predetermined time period, and then reading said dual tone multi-frequency signal;

providing said called party with an aural message representative of said telephone number corresponding to said calling party;

determining whether said called party has performed an off-hook operation; and stopping said called party's telephone from ringing and enabling execution of a conversation between said calling party and said called party when said called party has performed said off-hook operation.

2. The method as claimed in claim 1, further comprising a step of:

setting a time flag and stopping said called party's telephone from ringing and disconnecting said signal path when no said inputs of said dual tone multi-frequency signal representative of said telephone number corresponding to said calling party are provided by said calling party during said predetermined time period.

3. The method as claimed in claim 1, wherein said step of storing said dual tone multi-frequency signal and then reading said dual tone multi-frequency signal further comprises the steps of:

determining whether a predetermined number of maximum allowable key inputs have been input;

determining whether said predetermined key has been input when it is determined that said predetermined number of maximum allowable key inputs have not been input;

writing said inputs into a buffer while incrementing a first count value for each one of said inputs that is written into said buffer, when it is determined that said predetermined key has not been input;

reading said inputs from said buffer while incrementing a second count value for each one of said inputs that is read from said buffer, when it has been determined that one of said predetermined key and said predetermined number of maximum allowable key inputs have been input;

determining whether said calling party has performed said on-hook operation when said first count value and said second count value are equal;

initializing said second count value when said calling party has not performed said on-hook operation; and initializing said first count value and said second count value when said calling party has performed said on-hook operation.

4. A system for avoiding undesired incoming telephone calls, comprising:

a calling circuit connecting said system to telephone lines;

an on-hook sensing circuit for sensing an on-hook signal provided through said telephone lines and said calling circuit, said on-hook signal indicating that a calling party has performed an on-hook operation;

a dual tone multi-frequency decoder for decoding a dual tone multi-frequency signal representative of a telephone number corresponding to said calling party to generate decoded data, said dual tone multi-frequency signal being generated in response to key inputs provided by said calling party;

a ringer circuit for generating a ring signal in response to a telephone call initiated by said calling party;

a central processing unit for controlling transmission of a voice message to said calling party in response to said ring signal, storing said decoded data representative of said telephone number corresponding to said calling party, and controlling connection of a signal path over said telephone lines between a telephone corresponding to said calling party and said system in dependence upon a sensed state of said on-hook signal; and a voice control unit for transmitting said voice message to said calling party under control of said central processing unit as said ring signal is simultaneously provided from said ringer circuit, said voice message requesting said calling party to provide said key inputs representative of said telephone number corresponding to said calling party and then provide a predetermined key input to indicate that said key inputs have been completed, said voice control unit enabling a speaker to aurally provide an indication of said telephone number corresponding to said calling party.

5. A telephone system, comprising:

first means for generating a ring signal in response to an incoming telephone call during a selective calling mode of said telephone system;

second means, while said ring signal is being generated, for connecting a signal path between a telephone terminal of a calling party initiating said incoming telephone call and said telephone system, enabling transmission of a voice message to said calling party requesting said calling party to provide key inputs representative of a telephone number corresponding to said calling party and then provide a predetermined key input to indicate that said key inputs representative of said telephone number have been completed, and detecting a busy tone indicating that said calling party has performed an on-hook operation;

third means for receiving a dual tone multi-frequency signal derived from said key inputs representative of said telephone number corresponding to said calling party during a predetermined time period, storing said key inputs represented by said dual tone multi frequency signal, and then reading said key inputs in dependence upon whether said second means detects said busy tone;

fourth means for providing an aural indication of said telephone number corresponding to said calling party in response to said reading of said key inputs by said third means; and fifth means for enabling a conversation between said calling party and a called party corresponding to said telephone system when said called party chooses to respond to said incoming telephone call based on said aural indication.

6. The telephone system as claimed in claim 5, further comprised of said third means for receiving said dual tone multi-frequency signal derived from said key inputs representative of said telephone number corresponding to said calling party during said predetermined time period, determining whether said predetermined key input or a key input representative of a maximum allowable key input has been made by said calling party, writing said key inputs into a buffer while incrementing a first count value for each one of said key inputs that is written into said buffer when neither said predetermined key input nor said key input representative of said maximum allowable key input has been made by said calling party, reading said key inputs from said buffer while incrementing a second count value for each one of said key inputs that is read from said buffer when either said predetermined key input or said key input representative of said maximum allowable key input has been made by said calling party, determining whether said calling party has performed said on-hook operation when said first count value and said second count value are equal, initializing said second count value when said calling party has not performed said on-hook operation, and initializing said first count value and said second count value when said calling party has performed said on-hook operation.

7. A method for operating a telephone system, comprising the steps of:

ringing a called party's telephone and connecting a signal path between a calling party's telephone and said called party's telephone corresponding to said telephone system in response to a telephone call initiated from said calling party's telephone; transmitting a voice message to said calling party's telephone requesting that said calling party provide key inputs of a telephone number corresponding to said calling party's telephone and then provide a predetermined key input to indicate that said key inputs of said telephone number have been completely provided;

awaiting receipt of said key inputs of said telephone number for a predetermined time period;

receiving said key inputs of said telephone number during said predetermined time period and writing said key inputs into a buffer: detecting an input of said predetermined key;

reading said key inputs from said buffer when said input of predetermined key is detected;

providing an aural message to said called party indicating said telephone number corresponding to said calling party's telephone in response to said step of reading said key inputs from said buffer;

detecting an off hook condition of said called party's telephone after providing said aural message to said called party; and stopping said ringing of said called party's telephone when said off hook condition is detected.

8. The method as claimed in claim 7, further comprising a step of disconnecting said signal path between said calling party's telephone and said called party's telephone when no said key inputs are received during said predetermined time period.

9. The method as claimed in claim 8, further comprising a step of setting an internal time flag of said telephone system when no said key inputs are received during said predetermined time period.

10. The method as claimed in claim 7, further comprising the steps of:

detecting an input of a maximum number of key inputs before performing said step of detecting an input of said predetermined key;

performing said step of writing said key inputs of said telephone number into said buffer, when said predetermined key input and said input of said maximum number of key inputs have not been detected;

incrementing a first count value for each one of said key inputs that is written into said buffer;

performing said step of reading said key inputs from said buffer, when one of said predetermined key input and said input of said maximum number of key inputs has been detected; and incrementing a second count value for each one of said key inputs that is read from said buffer.

11. The method as claimed in claim 10, further comprising the steps of:

determining whether said first count value and said second count value are equal;.

determining whether said calling party has performed an on-hook operation when it is determined that said first count value and said second count value are equal;

continuing said steps of reading and incrementing said second count value, when it is determined that said first and second count values are not equal;

initializing said second count value when it is determined that said calling party has not performed said on-hook operation and returning to said step of determining whether said first count value and said second count value are equal; and initializing said first count value and said second count value when it is determined that said calling party has performed said on-hook operation.

12. The method as claimed in claim 11, further comprising a step of disconnecting said signal path between said calling party's telephone and said called party's telephone when no said key inputs are received during said predetermined time period.

13. The method as claimed in claim 12, further comprising a step of setting an internal time flag of said telephone system when no said key inputs are received during said predetermined time period.

14. The method as claimed in claim 7, further comprising a step of:

enabling execution of a conversation between said calling party and said called party when said called party decides, based on said aural message, to respond to said telephone call initiated by said calling party.

15. The method as claimed in claim 13, further comprising a step of:

enabling execution of a conversation between said calling party and said called party when said called party decides, based on said aural message, to respond to said telephone call initiated by said calling party.

* * * * *